United States Patent [19]

Van Eerden et al.

[11] 4,387,926
[45] Jun. 14, 1983

[54] SEAT POSITIONER

[75] Inventors: Richard L. Van Eerden, Ann Arbor; Norman D. Vial, Jr., Brighton; Irvin L. Slane, Chelsea, all of Mich.

[73] Assignee: Rockwell International Corporation, Pittsburgh, Pa.

[21] Appl. No.: 277,776

[22] Filed: Jun. 26, 1981

[51] Int. Cl.³ ............................................. A47C 1/027
[52] U.S. Cl. ..................................... 297/375; 74/531; 188/67
[58] Field of Search ............... 297/375, 374, 354, 355, 297/361; 188/67; 74/531; 248/410; 16/337, 341

[56] References Cited

U.S. PATENT DOCUMENTS

| 980,049 | 12/1910 | Beyer | 297/375 |
| 2,595,240 | 5/1952 | Glick et al. | 297/375 |
| 3,383,135 | 5/1968 | Posh | 297/361 X |
| 3,893,730 | 7/1975 | Homier et al. | 248/410 X |

Primary Examiner—William E. Lyddane

[57] ABSTRACT

A seat-positioning mechanism is disclosed and is of the type which includes an elongated housing having a rod slidably received therein for movement in either direction with respect to the housing. The housing contains friction lock elements which have a locked position canted about a fulcrum to be in frictional engagement with the rod. This engagement frictionally restrains the rod against the movement in at least one direction with respect to the housing. The friction lock elements have an unlocked position wherein the friction lock elements are disposed substantially perpendicular to said rod and out of frictional engagement therewith to permit free movement of the rod with respect to said housing to any selected position. The housing also includes a spring operatively connected to the friction lock element to urge the friction lock element towards the locked position. A cam, which is capable of tilting the friction lock element into the unlocked position is also included within the housing. A positioning element is located between the friction lock element and the spring. The positioning element is capable of preventing movement of the friction lock elements along the rod in the canted position upon actuation of the cam.

9 Claims, 8 Drawing Figures

SEAT POSITIONER

BACKGROUND OF THE INVENTION

1. Field of the Invention

This invention relates generally to seat-positioning mechanisms, and is particularly concerned with seat-positioning mechanisms of the type in which a rod or shaft member is pivotally attached to the seat back and slides within a locking mechanism fixedly attached to the seat.

2. Description of the Prior Art

The samples of positioning mechanisms of the general type with which this invention is concerned are shown in U.S. Pat. Nos. 2,595,240; 3,271,071; 3,383,135; 3,356,411; 3,419,306 and 4,099,777.

Many of the mechanisms of this type generally include a pair of elongated members slidably connected for telescopic movement between extended and retracted positions with respect to each other, and one or more friction washers have a locked position in frictional engagement with one of the members to restrain the members against relative movement and an unlocked position permitting free relative movement between the members. The friction washers are generally biased to lock the position, and a release cam or the like is selectively operable to remove the friction washers to the unlocked position against the biasing force. The friction washers engage a fulcrum, and are biased to tilt about the fulcrum to the locked position.

The improved mechanism set forth herein most closely resembles the locking device set forth in U.S. Pat. No. 2,595,240 and is an improvement on that basic design.

In automotive applications, federal law requires that a seat back withstand an inertial load equal to twenty times the forces due to gravity. Consequently, the locking device must be able to lock a shaft having 2,000 to 3,000 pounds of force applied thereto. It has been found that a device similar to that shown in U.S. Pat. No. 2,595,240 cannot withstand forces of this magnitude. It has been left to the present invention to provide a heavy duty, compact and relatively simple device for locking an automotive seat in place by preventing a linear motion of a shaft attached to the seat hinge.

SUMMARY OF THE INVENTION

It is an object of this invention to provide a seat-positioning mechanism which is capable of locking a rod-like member in any selected position, thereby positioning the seat back.

It is a further object of this invention to provide a compact seat-positioning mechanism which is slim enough to be mounted integrally with an automotive hinge assembly on the outside of the cushion frame of an automotive cushion without interferring with any other parts of the automobile, thereby permitting a simplified assembly of the seatback, hinge, and recliner mechanism without the need for special mounting brackets or an additional operation to attach the positioning mechanism.

It is a still further object of this invention to provide a seat-positioning mechanism capable of locking the seat back in any preselected position from motion in either direction.

It is yet an additional object of this invention to provide a compact seat-positioning mechanism which is capable of maintaining the seat back in the locked position with loads accelerated at twenty times the force of gravity are applied to the center of inertia of the seat back.

It is still a further object of the invention to provide a seat-positioning mechanism which while compact and capable of providing high locking forces is still economical to manufacture.

These and other objects of the invention are disclosed in the preferred embodiment for a seat-positioning of the type including an elongated housing having a rod slidably received therein for movement in either direction with respect to the housing. The housing contains a friction lock means which has a lock position canted about a fulcrum to be in frictional engagement with the rod, thereby frictionally restraining the rod against movement in at least one direction with respect to the housing. The friction lock means has an unlocked position wherein the friction lock means is disposed substantially perpendicular to the rod and out of frictional engagement therewith to permit free movement of the rod with respect to the housing to any selective position. The housing contains a biasing means operatively connected to the friction lock means to urge the friction lock means to the lock position and a cam means capable of urging the friction lock means into the unlock position. A positioning element is located between the friction lock means and the biasing means. The positioning element is capable of preventing movement of the friction lock means along the rod in the canted position upon actuation of the cam means.

These and other objects and advantages of the invention will become apparent from the following description of the accompanying drawings.

DESCRIPTION OF THE PREFERRED EMBODIMENT

Figure 1:
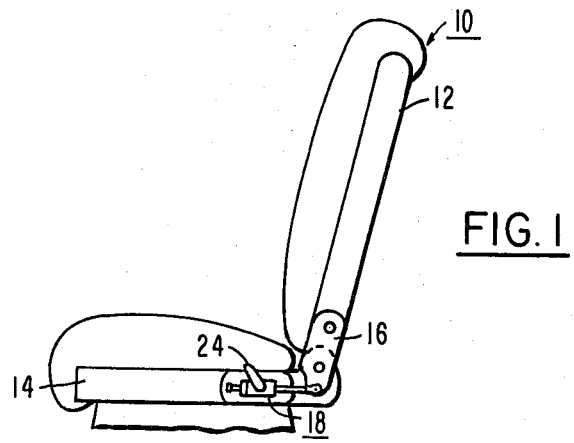
FIG. 1 is a view of an automotive seat which includes the seat-positioning mechanism of the present invention.

As can be seen in FIG. 1, there is an automotive seat generally denoted as 10 which includes a seat back frame 12 and a cushion frame 14. The seat back frame 12 and the seat cushion frame 14 are connected by a hinge 16 which permits relative movement of the seat back with respect to the seat cushion either in the forward or rearward direction. In order to ensure that the seat back frame 16 remains in any selective position with respect to the seat cushion frame 14. A seat-positioning mechanism generally denoted as 18 is provided. In the preferred embodiment, the seat-positioning mechanism 18 is on the side of the seat cushion frame which faces outwardly of the vehicle.

Figure 2:
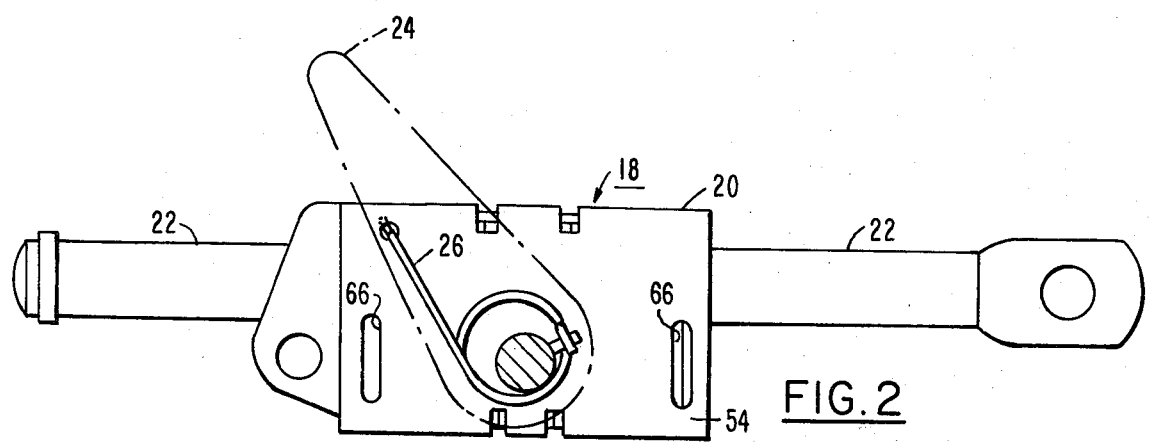
FIG. 2 is an enlarged elevation view of the seat-positioning mechanism shown in FIG. 1.
Figure 3:
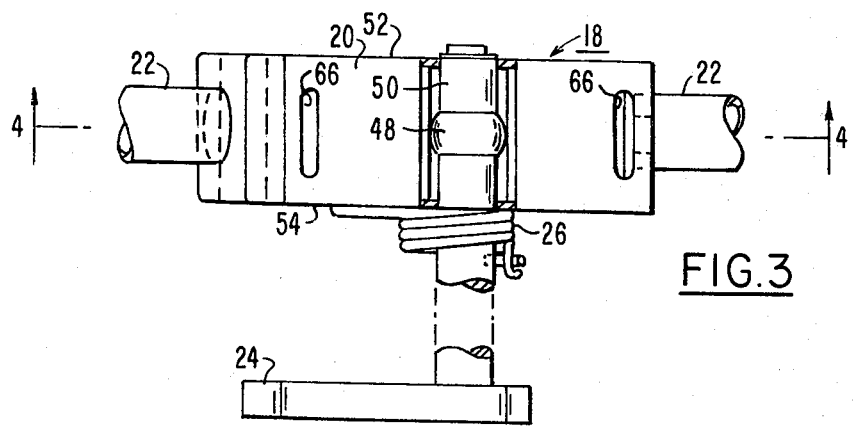
FIG. 3 is a plan view of the seat-positioning mechanism shown in FIG. 2.

As can be seen in FIGS. 2 and 3, the preferred seat-positioning mechanism 18 includes an elongated tubular housing 20 which contains a tubular rod 22 slidably received therein.

In the preferred embodiment, the housing 20 has a rectangular cross section. The housing is positioned on the seat cushion frame 14 with its narrow side facing outward to provide a slim profile.

The handle 24, whose function will be described in greater detail below, is provided for actuating the release of the seat-positioning mechanism 18. A spring 26, whose function will be described in greater detail below, is provided to urge the handle 24 into its locking position.

Figure 4:
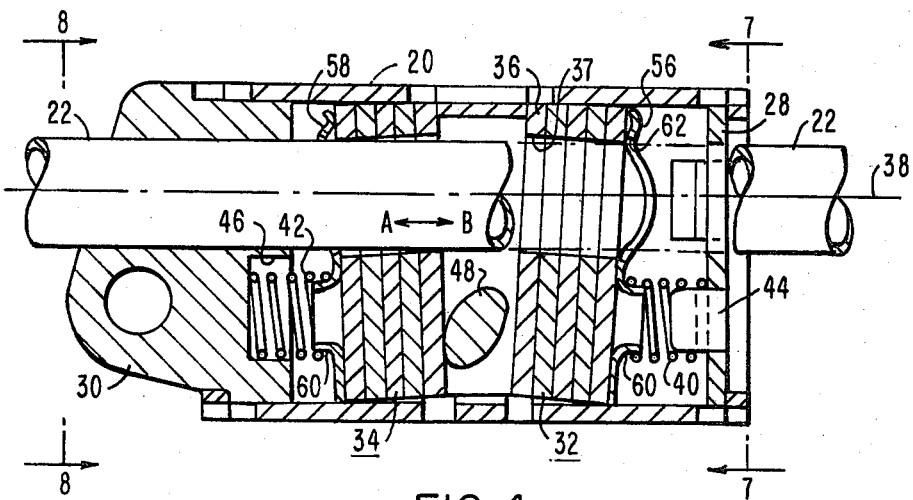
FIG. 4 is an enlarged sectional view of the seat-positioning mechanism shown in FIG. 3 along lines 4—4.

FIG. 4 shows a sectional view of the preferred seat-positioning mechanism. As can be seen from the Figure, a rod 22 is slidably received within said housing and is guided at the ends of said housing by end guides 28 and 30. The rod 22 is held in any selected position by a pair of friction lock means 32 and 34.

In the preferred embodiment, each friction lock means 32 and 34 is comprised of a plurality of lock washers 36 having a rod receiving hole 37. The washer 36, upon being canted or tilted with respect to an axis 38 which runs through the center of rod 22, frictionally engages the rod 22 at the upper portion of hole 37 to and prohibit movement thereof in either direction. It can be seen that the friction lock means 32 prevents movement of rod 22 in the direction B as indicated on FIG. 4 and the friction lock means 34 prevents movement of the rod 22 in the direction A. It can be seen that the elimination of either one of the friction lock means 32 or 34 would allow the rod 22 to move in one direction while locking the rod 22 from movement in the opposite direction.

In the preferred embodiment, the friction lock means 32 and 34 are urged into the canted locking position by biasing means 40 and 42, respectively. In the preferred embodiment, the biasing means 40 and 42 are coil springs. One end of coil spring 42 engages a tab 44 on end guide 28 while a similar end of spring 40 is captured within a recess 46 within end guide 30. The recess 46 and the tab 44 serve to support the springs 40 and 42 with respect to the housing 20.

In the preferred embodiment, the springs 40 and 42 operatively act on the friction lock means 32 34 by exerting a force through a fulcrum point to tilt or cant the lock means 32 34 into the locking position. The fulcrum point is the point of contact between each friction lock means 32, 34 and the rod 22. Therefore, in the preferred embodiment, the fulcrum point would be the point of contact between the lock washers 36 and the rod 22.

In the preferred embodiment, a cam means 48 is disposed between the pair of friction locking means 32 and 34. The cam means 48 is capable of engaging both friction locking means 32 and 34 and forcing them against spring means 40 and 42, respectively, to tilt the the washers 36 and preventing the movement of the lock washers 36 of both pairs of friction lock means 32 and 34 along rod 22 when release of the locking mechanism is desired.

Figure 5:
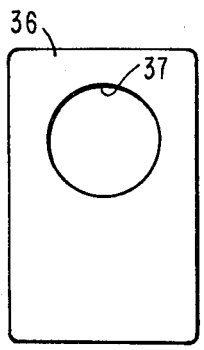
FIG. 5 is an end view of the locking elements shown in FIG. 4.
Figure 6:
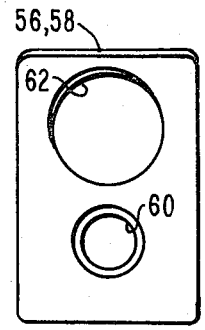
FIG. 6 is an end view of the positioning element shown in FIG. 4.

As can be seen in FIG. 5, the preferred lock washer 36 has a rectangular shape with a circular aperture to receive the rod 22 therethrough. The diameter of the aperture along with the diameter of the rod 22 is controlled so that the difference in diameters remains between 2 and 6 thousands of an inch. This ensures frictional engagement between the lock washer 36 and rod 22. In the preferred embodiment, each of the friction lock means 32 and 34 contains at least three washers 36. It has been found that any less than three washers is insufficient to lock the rod 22 against motion relative to housing 20 when the force of an occupant in the seat undergoes an acceleration or decceleration of twenty times the force of gravity (20 g). When an inertia generated by a 20 g acceleration is applied to the center of inertia of the seat back, the forces acting on rod 22 are between 2,000 and 3,000 pounds. With this much force, three or more lock washers are required to ensure that the mechanism remains locked during emergency operation of the vehicle.

Figure 7:
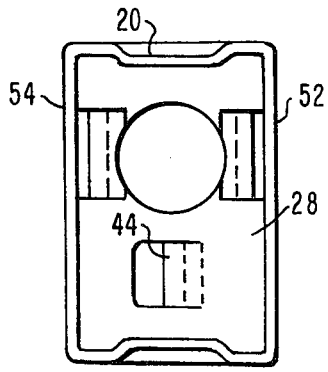
FIG. 7 is an end view of the seat-positioning mechanism shown in FIG. 4 along lines 7—7.
Figure 8:
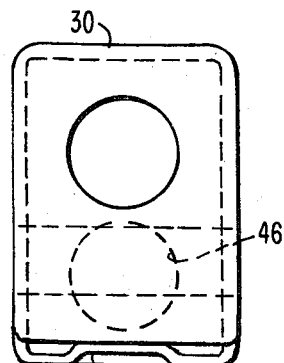
FIG. 8 is an end view of the seat-positioning mechanism shown in FIG. 4 along lines 8—8.

As can be seen in FIGS. 7 and 8, the end guides 28 and 30 are held to the housing 20 by cramping the housing 20 around the guides. As can be seen in FIGS. 2 and 3, the housing is provided with slots 66 to facilitate the cramping action around end guides 28 and 30.

From the above description, it can be seen that the positioning mechanism is operated by simply moving the lever 24 against the biasing of spring 36 which allows the friction lock means 32 and 34 to move to a position substantially perpendicular to axis 38, thereby unlocking the mechanism. Then the occupant would then move the seat back to the desired position and then releases the handle 24, allowing the biasing of the spring 26 to disengage the cam 48, allowing the friction lock means 32 and 34 to reassume their canted position, thereby locking rod 22. A spring (not shown) may be provided at the hinge 16 to bias the seat back forward, thereby assisting the occupant in positioning the seat back in the desired position. It should be noted that the seat back may be locked in any one of an infinite number of positions.

A further advantage of the seat positioning mechanism described above is that it is slim enough to be mounted integrally with an automotive hinge assembly on the outside of the cushion frame 14 without interfering with any other parts of the automobile. This permits the simplified assembly of the seat back, hinge and recliner mechanism without the need for a special mounting bracket or an additional operation to attach the seat positioning mechanism to the seat assembly.

While the preferred embodiment of the invention has been illustrated and described herein, variations will become apparent to one of ordinary skill in the art. Accordingly, the invention is not to be limited to the specific embodiment illustrated and described herein and the true scope and spirit of the invention are to be determined by reference to the amended claims.

The embodiments of the invention in which an exclusive property or privilege is claimed are defined as follows:

1. A seat-positioning mechanism of the type including an elongated housing having a rod slidably received therein for movement in either direction with respect to said housing with friction lock means received in said housing, said friction lock means having a locked position canted about a fulcrum to be in frictional engagement with said rod, thereby frictionally restraining said rod against movement in at least one direction with respect to said housing, and an unlocked position wherein said friction lock means is disposed substantially perpendicular to said rod and out of frictional engagement therewith to permit free movement of said rod with respect to said housing to any selected position and biasing means operatively connected to said friction lock means to urge said friction lock means toward the locked position and cam means capable of canting said friction lock means into said unlocked position; wherein the improvement comprises a positioning element located between said friction lock means and said biasing means, said positioning element capable of preventing movement of said friction lock means along said rod in said canted position upon actuation of said cam means.

2. A seat positioning mechanism as set forth in claim 1, wherein said positioning element is located against said friction lock means and is canted at the same angle as said friction lock means by said biasing means.

3. A seat positioning mechanism as set forth in claim 2, wherein said positioning element impinges on said rod while in said canted position, thereby preventing said movement of said friction lock elements.

4. A seat positioning mechanism as set forth in claim 3, wherein said positioning element contains a tab element extending at any acute angle with respect to said rod and capable of biting engagement with said rod.

5. A seat-positioning mechanism comprising:
a housing;
a rod adapted for linear movement with respect to said housing;
friction lock means operatively engaging said rod and movable to a canted position in frictional engagement with said rod for preventing relative movement between said rod and said housing and to a second position generally perpendicular to said rod for allowing relative movement between said rod and said housing;
biasing means capable of urging said friction lock means into frictional engagement with said rod;
means for urging said friction lock means against said biasing means and out of frictional engagement with said rod and a positioning element interposed between ssaid friction lock means and said biasing means, said positioning element capable of preventing movement of the said friction lock means with respect to said rod in said canted position.

6. A seat-positioning mechanism as set forth in claim 5, wherein said friction lock means comprises at least three metallic washers capable of frictionally restraining said rod against movement in one direction.

7. A seat-positioning mechanism of the type set forth in claim 5, wherein said friction lock means comprises two sets of at least three metallic washers, one of said sets of metallic washers capable of frictionally restraining said rod against movement with respect to said housing in one direction and the other of said metallic washer sets capable of restraining said rod against movement in the opposite direction with said housing.

8. A seat-positioning mechanism of the type including an elongated tubular housing of predetermined cross section, said housing having a rod slidably received therein for movement in either direction with respect to said housing with locking elements having a cross section substantially the same as said predetermined cross section, said locking elements having a locked position tilted about a fulcrum to be in frictional engagement with said rod, thereby frictionally restraining said rod against movement in at least one direction with respect to said housing and an unlocked position wherein said elements are disposed substantially perpendicular to said rod and out of frictional engagement therewith to permit free movement of said rod with respect to said housing; a biasing means operatively connected to said locking element to urge said locking element towards the locked position; a cam means capable of tilting said locking element into said unlocked position generally perpendicular to said rod; and a positioning element having substantially the same cross section as said predetermined cross section and located between said locking element and said biasing means; said positioning element tilted at the same angle as said locking elements, said positioning element capable of engaging and positioning said spring at one end thereof and impinging on the rod at the other end thereof while in asaid tilted position, thereby preventing movement of said locking elements along said rod while in said tilted position.

9. A seat-positioning mechanism as set forth in claim 8, wherein said positioning element contains a tab element extending at any acute angle with respect to said rod and capable of biting engagement with said rod.

* * * * *